United States Patent [19]
Reynolds

[11] Patent Number: 5,219,534
[45] Date of Patent: Jun. 15, 1993

[54] PROCESS AND APPARATUS FOR DECONTAMINATING AIR

[76] Inventor: Warren D. Reynolds, 3455 Spanish Way, Carlsbad, Calif. 92008

[21] Appl. No.: 847,348

[22] Filed: Mar. 9, 1992

Related U.S. Application Data

[63] Continuation-in-part of Ser. No. 682,379, Apr. 26, 1991, abandoned.

[51] Int. Cl.$^5$ .............................................. B01J 19/12
[52] U.S. Cl. .............................. 422/186.3; 422/186
[58] Field of Search ................ 422/24, 186.3, 186, 422/186.04, 186.07, 186.08, 186.1, 186.12; 204/157.15, 158.2; 55/176

[56] References Cited

U.S. PATENT DOCUMENTS

| | | | |
|---|---|---|---|
| 4,045,316 | 8/1977 | Legan | 204/158 R |
| 4,606,774 | 8/1986 | Morris | 134/10 |
| 4,780,287 | 10/1988 | Zeff et al. | 422/186.3 |
| 4,863,687 | 9/1989 | Stevens et al. | 422/4 |
| 4,882,021 | 11/1989 | Barnhart | 204/157.15 |
| 4,883,570 | 11/1989 | Efthimion et al. | 204/164 |
| 4,915,916 | 4/1990 | Ito et al. | 422/186 |
| 4,935,114 | 6/1990 | Varma | 204/157.43 |
| 4,941,957 | 7/1990 | Zeff et al. | 204/157.3 |
| 4,978,508 | 12/1990 | Hansen et al. | 422/186.08 |
| 4,990,311 | 2/1991 | Hirai et al. | 422/4 |

Primary Examiner—Donald P. Walsh
Assistant Examiner—Daniel Jenkins
Attorney, Agent, or Firm—Richard C. Litman

[57] ABSTRACT

An apparatus and method for irradiating a contaminated air stream emanating from contaminated sources which contain mixtures of one or more volatile toxic and hazardous organic solvents or petroleum product vapors, with ultraviolet wave energy below 200 nm is described. The apparatus includes an enclosed empty air flow duct to allow free flow of the contaminated air stream via a tube. Also included is a secondary fresh air stream which is to dilute and maintain the contaminated air stream at a predetermined concentration level. The apparatus further includes devices for measuring the flow rate of the contaminated air stream and for conducting on-line real time analysis of the diluted contaminated air stream. The air duct contains at least a first and second residence chambers separated by a wall divider having at least one opening in which is mounted at least one centrally located ultraviolet wave energy source extending into the air stream to allow the contaminated air stream to pass around and in close contact with the wave energy source. The irradiated contaminants are thus reduced to acid gases which may be removed by conventional methods.

21 Claims, 2 Drawing Sheets

PROCESS AND APPARATUS FOR DECONTAMINATING AIR

This application is a continuation-in-part or my patent application filed Apr. 26, 1991 Ser. No. 07/682,379 entitled: "An Improved Process and Apparatus for the Decontamination of Soil", which is now abandoned.

BACKGROUND OF THE INVENTION

1. Field of Invention

This invention relates to equipment and a method of decontaminating large volumes of air from any media, e.g. soil, that has been contaminated with mixtures of one or more toxic chlorinated organic solvents and petroleum products by wave energy below 200 nm. More specifically, this invention relates to the equipment and the method related to such chemical decontamination.

2. Description of the Prior Art

There is an urgent need for a portable practical means for the on-site clean up of solvent contaminated soil in situ by various types of low boiling toxic chlorinated organic solvents and/or petroleum products to unwanted non-toxic products. The following is a description of the process, equipment and major problems.

Both above ground and underground storage tanks are used for mixtures of waste chlorinated solvents and petroleum products as well as storage of these individual components. A large majority of these older tanks or their piping connections have leaked into the surrounding soil. Over the years, the soil surrounding the tanks as well as the groundwater have accumulated these materials in high concentrations. In addition, the accidental surface spillage of large volumes of these materials also have contaminated large areas of soil and have permeated into the underground water tables. These conditions represent a hazard to human health. In response to this health hazard, State and Federal Governments have passed laws regulating the clean up and disposal of such contaminated soil and groundwater.

One clean up method requires excavation of the soil and moving it to a truck mounted portable oxidation unit. The unit utilizes an enclosed rotating trommel system to mix an oxidant at room temperature with the contaminated soil. This mixture is then transferred to an enclosed conveyor system with an ultraviolet light source for increasing the reaction rate of the oxidant with the contaminants. This is described in U.S. Pat. No. 4,882,021. The cost of excavation of contaminated soil and the use of an oxidant is expensive. The process cannot be used under buildings encompassing many tens of thousands of tons of contaminated soil.

Another method for the removal of these volatile organic solvents and petroleum products is the use of vapor extraction from the contamination zone using large portable vacuum/blower pumps. In the removal of a mixture of volatile solvents including volatile petroleum products from the permeable soil formation, a high flow rate vacuum/blower pump arrangement is used to draw ambient or heated air at 200-1,000 cfm or higher through the underground formation to extract the organic solvents and/or petroleum products by means of volatilization. The exhaust air from the vacuum/blower pump containing the vapors at 50 to 20,000 ppmv or higher of toxic and hazardous organic solvent and petroleum products is required to be purified before discharge to the atmosphere due to health and safety regulations. This soil vapor extraction process is well known and described in detail in "Petroleum Contaminated Soils", vol 2, by P. T. Kostecki and E. J. Calabrese, editors, chapter 24; and volume 3, chapter 17 (Lewis Publishers, 1989 and 1990).

One attempted solution to the clean up of the chlorinated organic solvent contaminated air before discharge involves the use of ultraviolet wave energy destruction of the chlorinated compounds in the blower exhaust air stream or from water streams. The incoming vapors are adsorbed on a bed of quartz chips or silica gel while irradiating the bed with mercury ultraviolet wave energy in the range of 185-254 nanometers. This is contained in U.S. Pat. Nos. 4,780,287 and 4,941,957. There are limitations to this approach. The mercury wave energy source has only a few weak emission lines below 254 nm and the intensity of these lines is insufficient to destroy high concentrations (>100 ppm) of toxic and hazardous organic solvent vapors in a short period of time. In addition, the ultraviolet energy is reduced considerably in passing through the quartz chip bed to reach the adsorbed solvent vapor molecules. Subsequently, this is limited to low vapor concentrations of <100 ppm and flow rates of <50 cfm. For high incoming toxic and hazardous organic solvent vapor concentrations, e.g. >500 ppm, at flow rates of 300 cfm or higher, a very large packed bed of quartz chips would be required and would not readily allow a portable system.

Another method of removing malodorous or toxic gases from an air stream is contained in U.S. Pat. No. 4,863,687 using ozone, water vapor and ultraviolet wave energy in the range of 210-310 nm. This approach applies to low concentrations of malodorous and toxic gases <100 ppm. It requires the presence of water vapor as one of the reactants. In addition, ozone must be added at levels of 50-200 ppm. This is a disadvantage since it requires a large gas concentration of ozone which is energy intensive and costly to produce. This is not efficient for high vapor concentrations of >100 ppm.

Other approaches to the destruction of the toxic contaminants in an air stream involve using electron beams. U.S. Pat. Nos. 4,882,020 and 4,915,916 both use this method to destroy low concentrations of sulfur or nitrogen oxides either with or without the addition of ammonia at high flow rates. These patents do not address the use of organic solvent vapors or petroleum product vapors in the air stream. A major disadvantage is the use of the electron beam on explosive mixtures of solvents or petroleum product vapors in the air stream.

Another high energy approach for the destruction of waste toxic vapors and gases involves a high frequency electromagnetic wave generated plasma and reactants such as steam, methane, ammonia or acetylene at low concentrations. This is contained in U.S. Pat. No. 4,883,570. One major disadvantage is the potential explosion danger from plasma arcing along the influent pipe to the high incoming concentrations of organic solvents or petroleum product vapors. Another microwave process as shown in U.S. Pat. No. 4,935,114 requires the adsorption of trichloroethylene vapors in an air stream (<1 cfm) onto a charcoal bed doped with a catalyst in a two step process. The charcoal bed is then heated to 400 degrees Centigrade with microwave energy in a flowing air stream. At this temperature, a reaction occurs with the charcoal to produce decomposition gases of trichloroethylene such as hydrogen chloride as well as small amounts of methyl chloride, dichloroethylene and desorbed trichloroethylene vapors. One major disadvantage other than the process is not efficient is that the carbon could burst into flame in the air stream at these elevated temperatures. The process also requires heating for 60 minutes to achieve only 70% destruction of the trichloroethylene.

Thus, the prior art does not yield a satisfactory solution to the problem of ambient temperature rapid destruction of mixtures of high concentrations of one or more toxic and hazardous chlorinated organic solvents and petroleum product vapors in high volume air streams from any media, i.e. soils, in a transportable unit.

The present invention concerns an improved process and equipment for the ambient temperature rapid destruction of mixtures of high concentrations of one or more toxic and hazardous chlorinated organic solvents and petroleum product vapors in contaminated air streams to unwanted non-toxic compounds using ultraviolet wave energy below 200 nm.

This invention can be used for the in situ rapid decontamination of high flow rates of contaminated air arising from large volumes of soil containing toxic and hazardous chlorinated organic solvents and/or petroleum products from underneath buildings and other structures or from any other media other than soil.

SUMMARY

In accordance with the present invention, an improved method and transportable apparatus is disclosed for the rapid on-site destruction of mixtures of high concentrations of one or more toxic and hazardous chlorinated organic solvent vapors or petroleum product vapors in an air stream from contaminated sources to unwanted non-toxic compounds using wave energy below 200 nm, e.g. xenon or deuterium ultraviolet source.

An object of the present invention is to provide a mobile apparatus utilizing the above method which can be easily transported from one contaminated site to another.

It was described in my previous patent application that by passing chlorinated organic solvent or petroleum product vapors in an air stream in very close proximity to high intensity ultraviolet wave energy from a continuum source below 200 nm that the vapors could be oxidized with the oxygen already present in the air stream to unwanted acid gases. Whereas in my prior application a single ultraviolet wave energy source was oriented axially to the air stream flow, in my present application, I find it advantageous to provide one or more ultraviolet wave energy sources that are positioned transversly to the air flow. In addition, the wave energy source is positioned in the center of the opening in the wall divider in the air flow duct to provide restricted air passages around the wave energy source.

More particularly, the described method involves passing the contaminated air stream through a predetermined opening in a wall divider in the air flow duct having the high intensity ultraviolet wave energy source central to the opening. The location of the wave energy source in the opening creates restricted openings or slots on both sides of the wave energy source. The high volume air stream passes around and in very close proximity to the wave energy source due to the restricted air slots to provide cooling of the source and, more importantly, to provide an optimal irradiation air path as determined by the width of the slot enabling maximum exposure to the wave energy source.

The width of the air slot on both sides of the wave energy source is of critical dimensions to allow the rapid and efficient generation of and reaction of oxygen atom free radicals with the mixtures of one or more toxic and hazardous chlorinated organic solvents or petroleum product vapors in the air stream to unwanted acid gases. The width of the restricted air slot is dependent upon Beer's Law as given below:

$$\log(I_o/I) = (e)(C)(L)$$

Where $e$ = extinction coefficient for oxygen in air at 170–180 nm = $6.1 \times E$-19 cm/molecule.

$C = 4.9 \times E18$ molecules 0 per cm of air containing 20.94% oxygen.

$L$ = slot width.

$I_o$ = number of incident photons generated at source surface.

$I$ = number of photons after passing through the air width of thickness, $L$.

In order to maintain maximum destruction efficiency of the vapor contaminants, the product $(e)(C)(L)$ should be in the range of 3 to 9 which yields an air width of 1–3 centimeters.

For higher concentrations of contaminants in the air stream, a plurality of such spaced dividers, slots and wave energy sources in the air duct provide a more efficient and optimum method of reaction and destruction of the higher concentration of contaminants. The spacing of the series of in-line dividers in the air duct and location of the slots within the dividers are both of such critical dimensions as to allow an undulating flow path to create turbulence and good gas phase mixing with an average gas phase residence time of about 2 seconds between each divider. The total number and intensity of the ultraviolet wave energy sources in the system is dependent upon the maximum air concentration of the vapor mixtures to be destroyed.

Specifically, the method involves the generation of oxygen atom free radicals from the oxygen (21%) already in the air stream as well as generation of photoions and photolysis products of the contaminants to produce unwanted acid gases. The concentration of the oxygen in the air stream is not limiting provided it is above 5%.

DESCRIPTION OF THE PREFERRED EMBODIMENT

A detailed description of the preferred embodiment of the invention by way of example, together with the general principles of operation is given below and with reference to the drawings.

Figure 1:
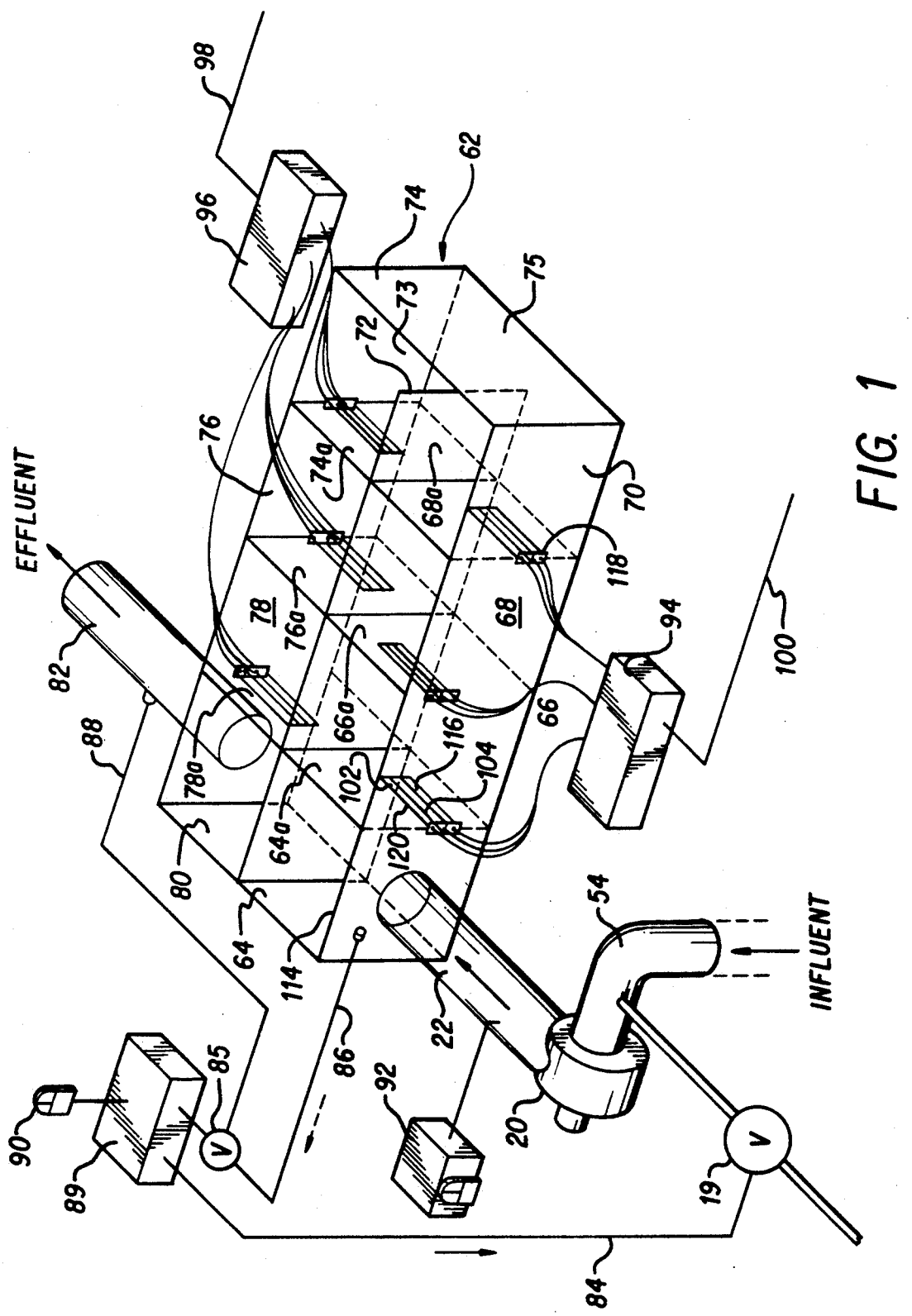
FIG. 1 is a schematic of a typical apparatus utilizing my novel method for conducting contaminated vapor through an air duct containing a plurality of dividers and openings that hold the ultraviolet wave energy source.

Referring to FIG. 1., an enclosed air duct 62 is shown suitable for the rapid destruction of mixtures of one or more toxic and hazardous chlorinated organic solvent and petroleum product vapors in an air stream at flow rates of 300 to 500 cfm containing up to 5,000 ppmv of toxic and hazardous vapors. The air duct 62 has an influent duct 54 for receiving the mixture of one or more toxic and hazardous chlorinated organic solvent or petroleum product vapors in an air stream.

The vacuum/blower 20 maintains a constant and known air flow rate through the connecting duct 22 into the first residence chamber 64. The contaminated air stream velocity and temperature are measured by means of an in-line probe connected to a read-out device 92. The flowing contaminated air stream is sampled by means of a port in residence chamber 64 through a small air sampling line 86 to a three way valve 85 to an on-line real time vapor analyzer 89 known to the art. The results of the real time analysis is displayed on the panel meter 90.

The vapor analyzer 89 has a predetermined vapor concentration set point dependent upon the number and intensity of ultraviolet wave energy sources in system 62. The vapor analyzer 89 proportionally controls a variable opening electric valve 19 by means of the electrical control line 84 to withdraw fresh air from the atmosphere. This make-up air through valve 19 dilutes the incoming contaminated air in duct 54 to maintain the total concentration of vapor contaminants in residence chamber 64 at or below the system maximum vapor contaminant design level. This feedback mechanism aids in optimizing the reaction efficiency of the mixtures of one or more toxic and hazardous chlorinated organic solvents or petroleum product vapors with the oxygen atom free radicals.

The air duct 62 has a central divider 72 that extends near the entire length of the duct 62. The spacing 73 between the central divider 72 and outside wall 75 allows the air stream to pass around the end of central divider 72. There are six individual dividers 64a, 66a, 68a, 74a, 76a, and 78a that extend outward from the central divider which separate the air duct 62 into six equal air residence chambers. The dimensions of the residence chambers are critical and are dependent on the designed air flow rate. The individual dividers 64a to 78a have slots to receive six removable ultraviolet wave energy source holders 120 that are typically shown in FIG. 2.

The process can be divided into a series of sequential ultraviolet irradiation steps of the contaminated air stream followed by a short residence time in adjoining chambers. Typically, the contaminated air stream passes from residence chamber 64 into residence chamber 66 through two parallel slots 102 and 116. The slots 102 and 116 enable the contaminated air stream to be irradiated over a short path length by passing the contaminated air stream around and in close proximity to the tubular ultraviolet wave energy source 104 located in the ultraviolet wave energy source holder 120. The wave energy source holder 120 is located in the lower part of divider 64a. The effect of passing mixtures of one or more toxic and hazardous chlorinated organic solvent and petroleum product vapors in close proximity to the ultraviolet source enhances the efficient reaction and destruction of these contaminant vapors by the ultraviolet source to unwanted acid gases. The air stream containing any remaining vapor contaminants passes on to additional ultraviolet irradiation sources and residence chambers in air duct 62.

The irradiation step is repeated five more times in passing through dividers 66a, 68a, 74a, 76a and 78a separating residence chambers 66, 68, 70, 74, 76, 78 and 80. These chambers are referred to as residence chambers because they enable the air stream to be momentarily delayed before passing through the openings in the dividers to ensure good mixing which averages out fluctuations in the vapor composition of the air flow. Each of the five dividers contain the typical source holder 120 having slots 102 and 116 and ultraviolet source 104. Between residence chambers 70 and 74, the air stream in residence chamber 70 containing any remaining contaminant vapors passes around the end of the central divider 72 and into residence chamber 74 where the irradiation process is repeated again in passing through divider 74a. As an option, the central divider 72 can be extended to outside wall 75 to make an additional divider with slot for a similar ultraviolet holder and source. By utilizing multiple irradiations in air duct 62, mixtures of one or more toxic and hazardous organic chlorinated solvents or petroleum product vapors can be more efficiently removed from the influent air stream.

For optimum reaction efficiency, the maximum allowable concentration of mixtures of one or more toxic and hazardous organic solvent or petroleum product vapors in the air stream is dependent upon the number and intensity of the ultraviolet sources 104. A greater or lesser number of ultraviolet sources and residence chambers can be used in other embodiments of the invention depending on the influent total contaminant vapor concentration. In addition, a plurality of openings and their wave energy sources could be provided in each wall divider.

It can be seen that by alternating the location of the source holders 120 at upper and lower portions in the dividers 64a to 78a creates an undulating air flow path resulting in air turbulence and good gas phase mixing in the high velocity air stream.

The ultraviolet wave energy sources located in the source holders 120 in dividers 64a, 66a, and 68a are controlled by suitable power supply and photoresistor feed back control unit 94 which is connected to the proper commercial power line 100. The ultraviolet wave energy sources located in the source holders in dividers 74a, 76a, 78a are controlled by suitable power supply and feedback control unit 96 which is connected to the proper commercial power line 98.

The effluent duct 82 has a port for sampling the air stream through air sampling line 88 to the three way valve 85. For periodic sampling of the effluent air stream, the three way valve 85 is adjusted to allow the air sample to reach analyzer 89. The results of the analysis is displayed on panel 90.

If the influent air stream in duct 22 coming into air duct 62 contains mixtures of one or more oxygenated solvents and petroleum hydrocarbon product vapors, then the unwanted gaseous products from the multiple irradiations consisting of the acid gas, carbon dioxide, can be vented to the atmosphere from effluent duct 82.

If the influent air stream in duct 22 coming into air duct 62 contain mixtures or one or more halogenated, nitrogen or phosphorus containing organic solvent vapors, then the unwanted acid gaseous products from the multiple irradiations are passed to a water scrubber known to the art to remove the resulting unwanted acid gases.

Figure 2:
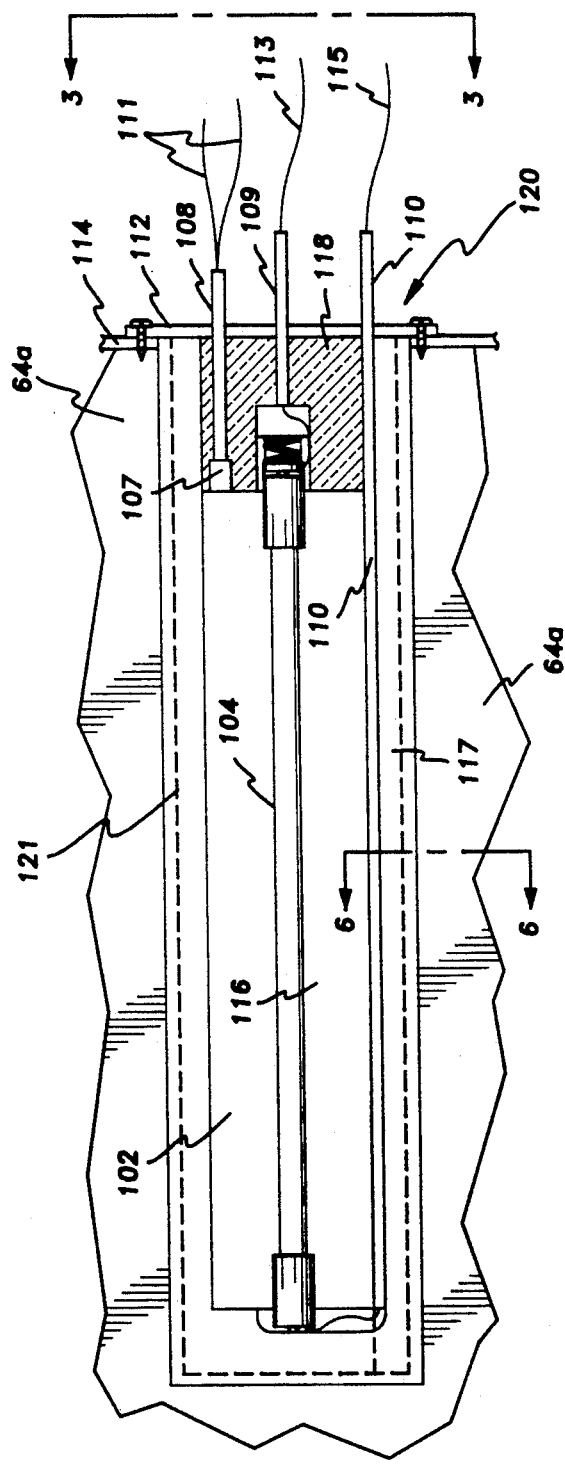
FIG. 2 is an enlarged section of a selected divider containing a typical holder for the ultraviolet wave energy source that is inserted in the slot of a divider of FIG. 1.

FIG. 2 shows a typical removable ultraviolet wave energy source holder 120 mounted in a typical divider 64a. The source holder has been designed to hold the ultraviolet source 104 in the center of a slot with air passages 102 and 116 above and below the ultraviolet source 104. This allows the contaminated air stream to come in close contact with and be irradiated over a short path length by the ultraviolet source 104. In addition, the high velocity air stream simultaneously cools the hot ultraviolet source 104 which lengthens the lifetime of the ultraviolet source 104. The openings 102 and 116 are of such critical dimensions as to enable sufficient cooling of the hot ultraviolet source 104 and to maintain optimum irradiation path length of the high intensity ultraviolet source 104 to achieve efficient generation of the oxygen atom free radicals and their reaction and destruction of the air borne vapor contaminants.

The tubular ultraviolet source 104 can be removed by means of the spring mechanism located in the end plate 118 of the source holder 120. A photoresistor 107 is recessed mounted in the end plate with electrical leads 111 passing out through an insulating tube 108 to the power supply and feedback control unit 94 or 96. The photoresistor 107 receives a small amount of the wave energy output from the ultraviolet tubular source 104 to maintain the ultraviolet source 104 at a constant output through a feedback control mechanism to the power supply 94 or 96. The ultraviolet tubular source is powered by electrical leads 113 and 115 contained in insulating tubes 109 and 110 connected to the power supply. These electrical leads contained in the insulating tubes 109 and 110 originate in metal contacts located at each end of the tubular ultraviolet source 104.

The removable source holder 120 is sealed air tight to the outside wall 114 of air duct 62 by means of a gasket and metal plate 112 using fasteners known to the art.

Figure 3:
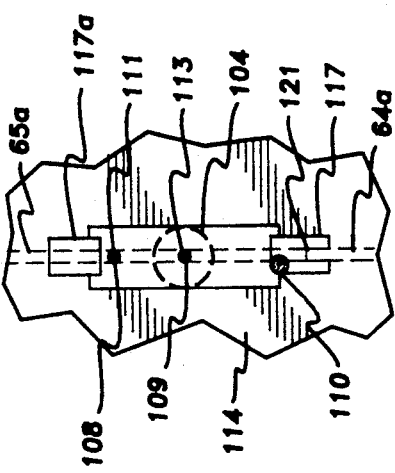
FIG. 3 is an end view taken along section 3—3 through the ultraviolet wave energy holder with the end plate removed showing the slots in the top and bottom for sliding the holder into the divider opening.

FIG. 3 shows an end view of the removable source holder 120. The ultraviolet source 104 is shown central in the source holder 120. The upper and lower sides 117a and 117 of the source holder 120 have grooves 121 in them to allow the source holder 120 to slide into and provide a tight seal on the thin divider 64a when inserting the source holder 120 into air duct 62.

Figure 4:
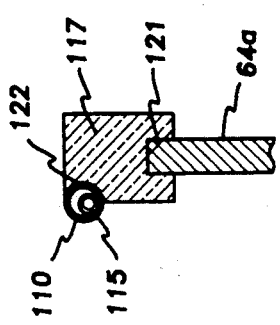
FIG. 4 is an enlarged view of the section taken along line 6—6 of FIG. 2.

FIG. 4 is an enlarged view of the section taken along line 6—6 of FIG. 2. The lower side 117 of the source holder 120 has groove 121 for an airtight seal with divider 64a. The lower side 117 also has a side groove 122 for attaching an insulating tube 110 to hold an electrical lead 115 (FIG. 2).

GENERAL PRINCIPLES

When high concentrations of organic solvent vapors in air are exposed to intense ultraviolet wave energy below 200 nm, the organic solvent vapors absorb the wave energy and begin to break down through a series of complex photoionizations, free radicals, photolysis and molecular elimination reactions involving the organic vapors, oxygen, nitrogen and other trace gases. Molecular oxygen, at near 21% concentration in air, has the highest concentration of any ultraviolet absorbing gas in the wavelength range of 200–140 nm. The strong absorption by oxygen at wavelengths below 200 nm generate a population of very reactive oxygen atom free radicals through a major pathway: $O_2 + h\nu$ ($<200$ nm) $= 2(\cdot O)$. This population of very active oxygen atom free radicals undergoes a number of extremely fast series of reactions with its nearest molecular neighbors such as oxygen, chlorinated hydrocarbons, petroleum product vapors or other organic solvents present in the air. The end products from the series of reactions of these organic compounds with the oxygen atom free radicals are acid gases.

Other oxidation reactions also contribute to the break down of the chlorinated organic solvents, petroleum products and other organic solvents via the ultraviolet wave energy below 200 nm. For example, molecular oxygen reacts with the ultraviolet generated photoionized and photolytic products of petroleum hydrocarbons, chlorinated hydrocarbons and other heteroatom organic compound vapors to yield break down products of acid gases.

TEST EXAMPLE

Prior to construction of the large scale transportable xenon ultraviolet source unit with six lamps, a small air flow unit containing a single xenon ultraviolet source was fabricated to test the efficiency of the design and compare the results with a mercury ultraviolet source. An air flow chamber was constructed from thin walled sheet steel with a 1.5 cu. ft. flow mixing chamber prior to the divider and a 1.0 cu. ft. residence chamber after the divider. The residence chamber terminated in a 2 inch diameter effluent pipe. A small centrifugal air blower powered by a 1 hp. motor was used to move air through the small test unit. The intake of the blower had a 4 in. dia. flexible metal hose that terminated near the bottom of a 40 gallon barrel partly filled with an air drying agent. The measured flow for all the tests was 360 cfm.

The ceramic divider used in this test unit was identical to that as seen in FIG. 2. A 6.8 Kw feedback power unit was used to power the xenon lamp. The xenon lamp was tubular 14 inches long $\times$ 1.2 cm O.D. A 2.5 Kw low pressure mercury ultraviolet lamp and power supply was used in a comparison test.

A small liquid transfer pump was used to spray the various liquid organic solvents at different pre-set rates into a heated zone in the intake duct to the mixing chamber. The air velocity was measured prior to the heated zone in the intake duct.

A small diaphragm air transfer pump was used to continuously sample the effluent from the test unit. This pump maintained a constant air sample flow rate to the organic vapor analyzer.

A series of experiments were conducted with several classes of organic solvents individually with the mercury ultraviolet source and the xenon ultraviolet source. In a series of separate tests, both types of ultraviolet sources were used to irradiate trichloroethylene, chlorobenzene and methanol in the high velocity air in the flow chamber. A deuterium source could be used in place of the xenon source. The results are shown in Table A.

TABLE A

| UV Source | Liquid flow mg/sec | Initial(+) air concn. ppmv | Final(+) air concn. ppmv | Amount destroyed ppmv | ppmv/watt·sec | Ratio Xe/Hg |
|---|---|---|---|---|---|---|
| Trichloroethylene | | | | | | |
| Hg | 147.6 | 160.6 | 160.3 | 0.3 | 1.1E-4 | 1 |
| Xe | 204.6 | 222.6 | 6.0 | 216.6 | 3.1E-2 | 290:1 |
| Trichloroethylene | | | | | | |
| Hg | 147.6 | 160.6 | 160.3 | 0.3 | 1.1E-4 | 1 |
| Xe | 215.2 | 234.1 | 9.0 | 225.1 | 3.3E-2 | 301:1 |
| Chlorobenzene | | | | | | |
| Hg | 27.3 | 35.2 | 35.0 | 0.2 | 8.0E-5 | 1 |
| Xe | 152.4 | 196.5 | 17 | 179.5 | 2.64E-2 | 240:1 |
| Methanol | | | | | | |
| Hg | 9.2 | 41.6 | 41.4 | 0.5 | 2.0E-4 | 1 |
| Xe | 68.0 | 307.6 | 22 | 285.6 | 4.2E-2 | 210:1 |

(+)Corrected for FID analyzer response factor.

Thus, in comparing the xenon ultraviolet source to the mercury ultraviolet source on an equivalent basis of ppmv/watt.sec, one can see that the xenon ultraviolet source has the greater efficiency on the order of 200–300 fold.

A second series of unreported tests were conducted using the 6.8 Kx xenon ultraviolet source in the air flow unit individually with gasoline, cyclohexylamine and triethyl phosphate at levels of 50 to 400 ppmv in the 300–400 cfm air stream. These organic compounds were not detected in the effluent air stream by the analyzer indicating >99% oxidation efficiency.

A further enhancement of the process can be achieved by the use of reflective coatings or mirrors on the inside walls of the residence chambers.

I claim:

1. An apparatus for irradiating a contaminated air stream emanating from contaminated sources which contain mixtures of one or more volatile toxic and hazardous organic solvents or petroleum product vapors with ultraviolet wave energy below 200 nm comprising:
   a first means for passing the contaminated air stream via a tube into an enclosed empty air flow duct to allow free flow of said contaminated air stream;
   a second means for introducing a secondary fresh air stream into an inlet of said first means to dilute and maintain the contaminated air stream at a predetermined concentration level;
   a means for measuring a flow rate of said contaminated air stream;
   said air duct containing at least a first and second residence chambers separated by a wall divider;
   said divider containing at least one opening in which is mounted at least one centrally located ultraviolet wave energy source extending into said air stream to allow said contaminated air stream to pass around and in close contact with said wave energy source, wherein said contaminated air stream is irradiated by said wave energy source;
   an analyzer means for conducting on-line real time analysis of said diluted contaminated air stream in said first residence chamber, said analyzer means being capable of analyzing any residual contaminated mixtures in an effluent air stream from said second residence chamber; whereby
   said ultraviolet wave energy source functions to generate oxygen atom free radicals, other free radicals, ions, and ozone to react with the contaminated air stream to produce unwanted acid gases, and wherein said effluent air stream containing the unwanted acid gases, being passed from said second residence chamber, can be disposed of in any manner known to the art.

2. The apparatus of claim 1 wherein the energy source extends in the opening transversally to the air flow to form a restricted air passage on each side thereof.

3. The apparatus of claim 2 wherein said second means comprises an air inlet valve for controlling the flow rate of the secondary air stream.

4. The apparatus of claim 2 wherein said air duct has a squarelike cross-section.

5. The apparatus of claim 2 wherein said ultraviolet wave energy source is mounted central in the opening of said divider wall transversal to the air stream.

6. The apparatus of claim 2 wherein each of said residence chambers have a specific and unobstructed volume to retain said contaminated air stream for a short period of time.

7. The apparatus of claim 2 wherein said air duct contains more than two residence chambers being separated by wall dividers.

8. The apparatus of claim 7 wherein said wall dividers have openings therein being located alternately in the upper and lower portions of said wall dividers to produce an undulating air stream through the air duct for maximizing the turbulence and mixing of said contaminated air stream.

9. The apparatus of claim 2 wherein the said ultraviolet source is a xenon source with a wave energy below 200 nm.

10. The apparatus of claim 2 wherein the said ultraviolet source is a deuterium source with a wave energy below 200 nm.

11. The apparatus of claim 2 wherein said residence chambers have inner walls with an ultraviolet reflective surface.

12. The apparatus of claim 7 wherein selected wall dividers contain a plurality of said openings in each of which is mounted an ultraviolet wave energy source.

13. The apparatus of claim 2 wherein said apparatus can be mobile.

14. A method of air decontamination including the steps of:
   extracting and pressurizing a contaminated air stream containing oxygen and mixtures of one or more toxic and hazardous organic solvent or petroleum product vapors from a contaminated source;
   maintaining the total concentration level of the vapor components in said pressurized contaminated air stream at or below a predetermined level; and irradiating said pressurized air stream over a predetermined irradiation path with ultraviolet wave energy below 200 nm to generate oxygen atom free radicals, photoions, photolysis products and other free radicals to efficiently react and to destroy in said contaminated air stream said vapor mixtures to unwanted acid gases.

15. The method of claim 14 wherein the method further includes the step of providing said vapor mixtures with a mixture of one or more of organic vapors from any of the following classes of organic compounds: saturated and unsaturated hydrocarbons, aromatic compounds, nitrogen compounds, oxygenated compounds, phosphorus compounds and halogenated compounds.

16. The method of claim 14 wherein the step of irradiating said pressurized contaminated air stream further includes the step of generating oxygen free radicals from oxygen already present in the air stream.

17. The method of claim 14 wherein the step of irradiating further includes the step of providing free radicals with a reaction rate constant with said mixtures of one or more toxic and hazardous organic vapors in the air stream of about $1 \times 10E\text{-}10$ to $1 \times 10E\text{-}13$ cm 3/molecule.sec.

18. The method of claim 14 wherein the step of irradiating said pressurized contaminated air stream further includes the step of photoionizing and photolyzing said vapor mixtures in said air stream and their reaction with oxygen to produce unwanted acid gases.

19. The method of claim 14 wherein said irradiating step further includes the step of passing of the air stream around and in close proximity to a plurality of ultraviolet wave energy sources.

20. The method of claim 14 wherein said the method further includes the step of providing a short irradiation path for the air stream, said path being determined by the formula: $\log(I_0/I) = (e)(C)(L)$, where L is the irradiation path length.

21. The method of claim 19 wherein the method further includes the step of undulating the air stream to create turbulence and improve the mixing of the vapor components.

* * * * *